United States Patent
Peynet et al.

(10) Patent No.: US 11,386,389 B2
(45) Date of Patent: Jul. 12, 2022

(54) SECURED ELECTRONIC LOCKER SYSTEM

(71) Applicant: QUADIENT TECHNOLOGIES FRANCE, Bagneux (FR)

(72) Inventors: Christophe Peynet, L'Hay les Roses (FR); Patrick Blanluet, Paris (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 1083 days.

(21) Appl. No.: 15/726,862

(22) Filed: Oct. 6, 2017

(65) Prior Publication Data

US 2018/0101820 A1 Apr. 12, 2018

(30) Foreign Application Priority Data

Oct. 7, 2016 (EP) .................................. 16306329

(51) Int. Cl.
*G06Q 10/08* (2012.01)
*G07C 9/00* (2020.01)
(Continued)

(52) U.S. Cl.
CPC ......... *G06Q 10/0836* (2013.01); *G06Q 10/08* (2013.01); *G07C 9/00309* (2013.01);
(Continued)

(58) Field of Classification Search
CPC ...... G06Q 10/0836; G06Q 10/08; G07C 9/28; G07C 9/00309; G07C 9/00896;
(Continued)

(56) References Cited

U.S. PATENT DOCUMENTS 3,694,999 A 10/1972 Switliski et al.
4,420,924 A 12/1983 Hoyrup et al.
(Continued)

FOREIGN PATENT DOCUMENTS

CN 107240201 A * 10/2017 ......... G06Q 30/0645
JP 2015530645 A 10/2015
(Continued)

OTHER PUBLICATIONS

Hae-Duck J. Jeong, Jiyoung Lim and WooSeok Hyun, A Remote Lock System Using Bluetooth Communication, 2014 Eighth International Conference on Innovative Mobile and Internet Services in Ubiquitous Computing, pp. 441-446 (Year: 2014).*
(Continued)

*Primary Examiner* — Emmett K. Walsh
*Assistant Examiner* — Larita L. Yusuf
(74) *Attorney, Agent, or Firm* — Cozen O'Connor

(57) ABSTRACT

A method for operating electronic lockers for parcel deposit and collection and pick-up wherein a remote shipping system transmits to at least one mobile device via a long distance communication network data related to parcels to be handled by at least one electronic locker and wherein a user operates the at least one electronic locker with the at least one mobile device via a short distance communication network without using a user interface of the at least one electronic locker and wherein the at least one electronic locker using the at least one mobile device via the short distance communication network transmits data related to parcels handling during the user operation of the at least one electronic locker.

13 Claims, 10 Drawing Sheets

(51) Int. Cl.
*G07F 17/10* (2006.01)
*G07C 9/28* (2020.01)
*G07F 9/00* (2006.01)
*A47G 29/14* (2006.01)
*H04W 4/80* (2018.01)
*H04W 84/04* (2009.01)

(52) U.S. Cl.
CPC ..... *G07C 9/00896* (2013.01); *G07C 9/00912* (2013.01); *G07C 9/28* (2020.01); *G07F 9/001* (2020.05); *G07F 9/002* (2020.05); *G07F 17/10* (2013.01); *A47G 29/141* (2013.01); *A47G 2029/145* (2013.01); *A47G 2029/149* (2013.01); *H04W 4/80* (2018.02); *H04W 84/042* (2013.01)

(58) Field of Classification Search
CPC ..... G07C 9/00912; G07F 9/002; G07F 17/10; H04W 4/80; H04W 84/042; A47G 29/141; A47G 2029/145; A47G 2029/149
See application file for complete search history.

(56) References Cited

U.S. PATENT DOCUMENTS

| | | | |
|---|---|---|---|
| 6,048,421 A | 4/2000 | White | |
| 6,598,375 B2 | 7/2003 | Connelly | |
| 2002/0080030 A1* | 6/2002 | Inomata | G07F 17/12 340/542 |
| 2002/0178016 A1* | 11/2002 | McLellan | G06Q 10/0836 705/339 |
| 2003/0009985 A1 | 1/2003 | Close et al. | |
| 2005/0015349 A1* | 1/2005 | Mayer | G07C 9/33 705/406 |
| 2015/0211258 A1* | 7/2015 | Gokcebay | E05C 1/04 70/278.1 |
| 2015/0356801 A1* | 12/2015 | Nitu | G07C 9/00904 340/5.61 |
| 2016/0216106 A1* | 7/2016 | Motoyama | G01B 11/28 |
| 2017/0134452 A1* | 5/2017 | Belimpasakis | H04L 65/4084 |
| 2018/0060800 A1* | 3/2018 | Robinson | G07C 9/00571 |

FOREIGN PATENT DOCUMENTS

| | | |
|---|---|---|
| JP | 2020044039 A * | 3/2020 |
| WO | 2014022795 A1 | 2/2014 |
| WO | 2014117817 A1 | 8/2014 |
| WO | 2014118629 A2 | 8/2014 |
| WO | 2016030857 A1 | 3/2016 |
| WO | 2016059218 A1 | 4/2016 |

OTHER PUBLICATIONS

European Search Report, dated Mar. 31, 2017, for European Application No. 16 30 6329, 2 pages.

"International Fibreboard Case Code," published by FEFCO and ESBO, 2007, 11th edition, 55 pages.

* cited by examiner

SECURED ELECTRONIC LOCKER SYSTEM

TECHNICAL FIELD

The present application relates to a method and system for depositing shipments by a delivery agent into an electronic parcel locker system comprising several lockable compartments, and for retrieving these shipments thereafter.

PRIOR ART

Electronic parcel locker systems are used for dropping-off, storing and picking up various kinds of shipments such as parcels or packages. Such parcel lockers systems typically are used by carrier agents for dropping shipments, which are then picked-up from the parcel locker by recipients. Electronic parcel lockers have a user interface for the carrier agent or the recipient to operate the parcel locker, which is used for depositing the shipment in the case of the carrier agent or for picking-up the shipment in the case of the recipient. This interface allows the user to enter information for operating the parcel locker and allows the parcel locker to provide information back to the user. For recent electronic parcel lockers, this functionality typically is fulfilled by a touchscreen. The user interface also is used to capture information attached to the shipment or to some user identification means. This functionality can be fulfilled by barcode readers reading printed barcodes or other technologies such as radiofrequency communication for reading RFID tags or near field communication. Electronic parcel locker systems generally comprise a network of parcel lockers, all communicating with a remote central system in charge of managing the network of parcel lockers. The communication between each parcel locker and the remote central system is performed by long distance communication technologies such as 3G or 4G GSM.

FIG. 10 describes a conventional electronic parcel locker system, which comprises an electronic parcel locker 10 communicating via a long distance communication network 20 with a remote shipping system 25, which manages authorization access to the electronic parcel locker and data regarding the shipments to be handled by the electronic parcel locker. The electronic parcel locker comprises a series of compartments 30$i$ with different sizes and equipped with an electronically controlled door. The electronic parcel locker operation, and in particular the opening and closing of the compartment doors, is controlled by a control unit 32. This control unit 32 controls the communication with the remote shipping system 25 and the parcel locker user interface, which typically includes a touchscreen 34 and a barcode reader 36. When a carrier agent comes for depositing parcels into the electronic parcel locker 10, the identification of each parcel 40 must be captured by the electronic parcel locker and associated with the compartment where it is deposited. For tracking purposes, an identification means 38 in the form of a barcode label is affixed onto each parcel 40. The capture of each parcel identification means is performed with the barcode reader 36 included in the electronic parcel locker interface. The carrier agent has to position the parcel identification barcode in front of the barcode reader 36 for each parcel before depositing it in the designated compartment. This means that, after depositing a parcel in a compartment, the carrier agent must come back to the parcel locker user interface in order to capture the identifier of the next parcel to be deposited, which is both time-consuming and tiresome for the agent.

Conventional parcel locker systems and the associated architecture have several issues. The current solutions for the user interfaces, which involve touch screens and barcode readers, are costly and also require embedding costly components in the electronic parcel lockers and also leads to significant electric consumption. Another issue results from the usage of wireless long distance communication, which does not operate everywhere. The installation locations for electronic parcel lockers are limited to areas well covered by wireless long distance communication. In particular, electronic parcel lockers cannot be easily installed in underground locations where wireless long distance communication does not propagate. Additionally, wireless long distance communication requires embedding costly and complex components in the electronic parcel lockers and leads to significant electric consumption. A further issue is that the code authorizing the usage of the electronic parcel locker typically is entered manually by the parcel locker user. As the usage friendliness of the electronic parcel locker cannot be impacted by too complex codes, the complexity of the authorization codes is limited, therefore limiting the security of the parcel locker access.

SUMMARY

Various embodiments may provide more secured access to electronic parcel lockers, overcoming the drawbacks of conventional approaches described above.

In at least one embodiment, a method for operating electronic lockers for parcel delivery (deposit and collection) and pick-up is provided wherein a remote shipping system transmits to at least one mobile device via a long distance communication network data related to parcels to be handled by at least one electronic locker and wherein a user operates the at least one electronic locker with the at least one mobile device via a short distance communication network without using a user interface of the at least one electronic locker and wherein the at least one electronic locker using the at least one mobile device via the short distance communication network transmits data related to parcels handling during the user operation of the at least one electronic locker and wherein, for parcel deposit by an operator, only an operator identifier of said operator or only a mobile device identifier of said at least one mobile device is transmitted by said at least one mobile device to said at least one electronic locker for allowing access with said at least one mobile device to said at least one electronic locker. In other words, the only user interface for the user to operate the at least one electronic locker is the user interface of the at least one mobile device.

According to at least one aspect, the at least one mobile device automatically initiates communication with the at least one electronic locker via the short distance communication and automatically performs an authorization procedure for allowing the at least one mobile device to operate the at least one electronic locker based on an identifier stored in the at least one mobile device and based on tables stored in the at least one electronic locker. As this authorization procedure is performed automatically without any data entry by the user, it can be as complex and therefore as secured as required.

In a preferred embodiment, user roles are pre-defined for each type of users of the at least one electronic locker, following on the authorization procedure, access to the at least one electronic locker for the user is allowed, and the user operates the at least one electronic locker based on his user role.

According to another aspect, no data is exchanged directly via any long distance communication network between the at least one electronic locker and the remote shipping system and in that data exchanges between the at least one electronic locker and the remote shipping system are performed via the at least one mobile device. Data exchanges between the at least one electronic locker and the remote shipping system are performed only via the at least one mobile device. The replacement of long distance communication by short distance communication ensures that electronic locker can be installed in any locations avoiding the intrinsic limitations of long distance communication. Additionally, over the past years, short distance communication technologies such as Bluetooth or WIFI have a better time sustainability compared to long distance communication technologies such as GSM, which are subject to regular evolutions, therefore requiring updating electronic locker equipment in the field.

In a particular embodiment, the identifier stored in the at least one mobile device and used in the authorization procedure for allowing the at least one mobile device to operate the at least one electronic locker, is an identifier of the at least one mobile device.

In at least one embodiment, a method for picking-up a parcel by a recipient in at least one electronic locker is provided wherein a remote shipping system communicates with at least one mobile device via a long distance communication network and wherein the recipient operates the at least one electronic locker with the at least one mobile device via a short distance communication network, comprising act: downloading onto the at least one mobile device a pick-up application for managing access by the recipient to the at least one electronic locker and for operating the at least one electronic locker, automatically activating the pick-up application by a notification sent by the remote shipping system to the at least one mobile device, and receiving onto said at least one mobile device a recipient authorization code generated after the deposit of said parcel by a carrier agent in said at least one electronic locker, wherein said recipient authorization code is the only data required for opening the compartment where the parcel has been deposited. The download of the pick-up application allows for automatic handling of the notification and automatic activation of the short distance communication, which provides a seamless user-friendly experience for the recipient who does not have to activate the short distance communication nor have to remember about it so that connection with the electronic locker can be fully automatic.

Preferably, the notification includes data to operate the at least one electronic locker for picking-up the parcel comprising at least a recipient authorization code. Advantageously, the pick-up application automatically deletes the notification received by the at least one mobile device. In another embodiment, the pick-up application automatically turns on the short distance communication used for the at least one mobile device to communicate with the at least one electronic locker.

In yet a further embodiment, a method for deposit or collection of parcels by a carrier agent in at least one electronic locker is provided wherein an operator operates the at least one electronic locker with at least one mobile device via a short distance communication network, and wherein: operator roles pre-defined for each type of operators of the at least one electronic locker and a list of electronic lockers authorized for each operator are stored in a operator storage of the at least one mobile device, the carrier agent logs in on his mobile device, which identifies the operator role of the carrier agent and the list of electronic lockers that the carrier agent is authorized to operate, following on an authorization procedure, access to the at least one electronic locker for the carrier agent is allowed based on the list of electronic lockers authorized for the carrier agent, and the carrier agent operates the at least one electronic locker based on his operator role. Once the deposit is completed a unique recipient authorization code is provided to each recipient of a deposited parcel. Typically each operator role is associated with set of functionalities.

In a preferred embodiment, an identifier of the at least one mobile device is stored in the operator storage of the at least one mobile device and a mobile device identifiers table is stored in a storage of the at least one electronic locker, and during an authorization procedure for allowing the at least one mobile device to operate the at least one electronic locker, a match is performed between the identifier of the at least one mobile device and the mobile device identifiers table.

In yet even a further embodiment, a computerized electronic locker system for parcel deposit and collection and pick—is provided up, comprising: a remote shipping system, a long distance communication network, and at least one electronic locker, characterized in that it further comprises at least one mobile device and a short distance communication network, the at least one mobile device communicating with the at least one electronic locker via the short distance communication network and with the remote shipping system via the long distance communication network and in that the user interface of the at least one mobile device is the only user interface for the user to operate the at least one electronic locker. Therefore, the at least one electronic locker does not include any user interface as the at least one electronic locker is operated by a user only with the at least one mobile device via the short distance communication.

Various embodiments also allow for a simpler electronic locker architecture, avoiding user interface with touch screen and barcode reader, therefore reducing cost and electric consumption. The usage of short distance communication technology also allows for direct communication between electronic lockers within a particular area avoiding the need for costly and cumbersome cabling for connecting several electronic lockers. This is particularly beneficial for example in a commercial center where several electronic lockers may be installed. Communicating electronic lockers can more easily guide users for finding and operating the appropriate electronic locker within the commercial center. Short distance communication technology also allows for easily adding compartments to an electronic locker already installed in the field without any need for cabling and electrical connections between the added compartments and the previously installed electronic locker. The control unit of the previously installed electronic locker can control the added compartment via the short distance communication.

According to at least one aspect, the at least one mobile device comprises an identifier for automatically allowing the at least one mobile device to operate the at least one electronic locker via the short distance communication network based on tables stored in the at least one electronic locker, so that a match between the unique identifier and the tables can be performed for authorizing the user to operate the at least one electronic locker.

According to another aspect, the computerized electronic locker system further comprises a pre-defined user roles table and in that it has means for associating each user to a user role and a pre-defined set of functionalities.

In a preferred embodiment, the at least one mobile device comprises a pick-up application for managing the access by a parcel recipient to the at least one electronic locker and in that the at least one electronic locker and the remote shipping system exchange data only via the at least one mobile device. The download of the pick-up application onto the at least one mobile device allows for automatic handling of the notification and automatic activation of the short distance communication, which provides a seamless user-friendly experience for the recipient who does not have to activate the short distance communication nor have to remember about it so that connection with the electronic locker can be fully automatic.

Various embodiments also advantageously provide several simplifications for user interaction with the electronic locker as compared with current electronic lockers. The carrier agent reads each parcel barcode with the barcode reader embedded in his mobile device, and therefore does not have to come back to the electronic locker control panel for scanning each parcel, which he has to deposit, with a barcode reader embedded in the electronic locker control panel. The user does not have to manually enter his authorization code for operating the electronic locker.

BRIEF DESCRIPTION OF THE DRAWINGS

Other aspects, features and advantages of the teachings of various embodiments of the invention will become clearer to those ordinary skilled in the art upon review of the following description in conjunction with the accompanying drawings where.

DETAILED DESCRIPTION

According to the electronic parcel locker (EPL) system of as at least some embodiments, the user interface for operating the parcel locker of the prior art is replaced by the user mobile device, which is carried by the user of the EPL. For example, a carrier agent uses his mobile device, typically a dedicated personal digital assistant (PDA), for operating the EPL during the process for depositing in the EPL parcels, which are due to be pick-up by recipients, or during the process for collecting from the EPL parcels, which are overdue because they have not been picked-up by the recipients within the required time limits. For example, the recipient uses his smartphone for operating the EPL during the process for picking-up from the EPL parcels, which have been deposited by a carrier agent. All user actions required to be performed via the user interface of the prior art EPL, and in particular all user data entries performed via the user interface of the prior art EPL, are performed according to at least some embodiments of the presently described invention via the user mobile device 102 or 104 as represented on FIG. 1 or via the user mobile device 502 or 504 as represented on FIG. 5. Therefore, no EPL user interface including components such as a touchscreen or a barcode reader is required.

Figure 1:
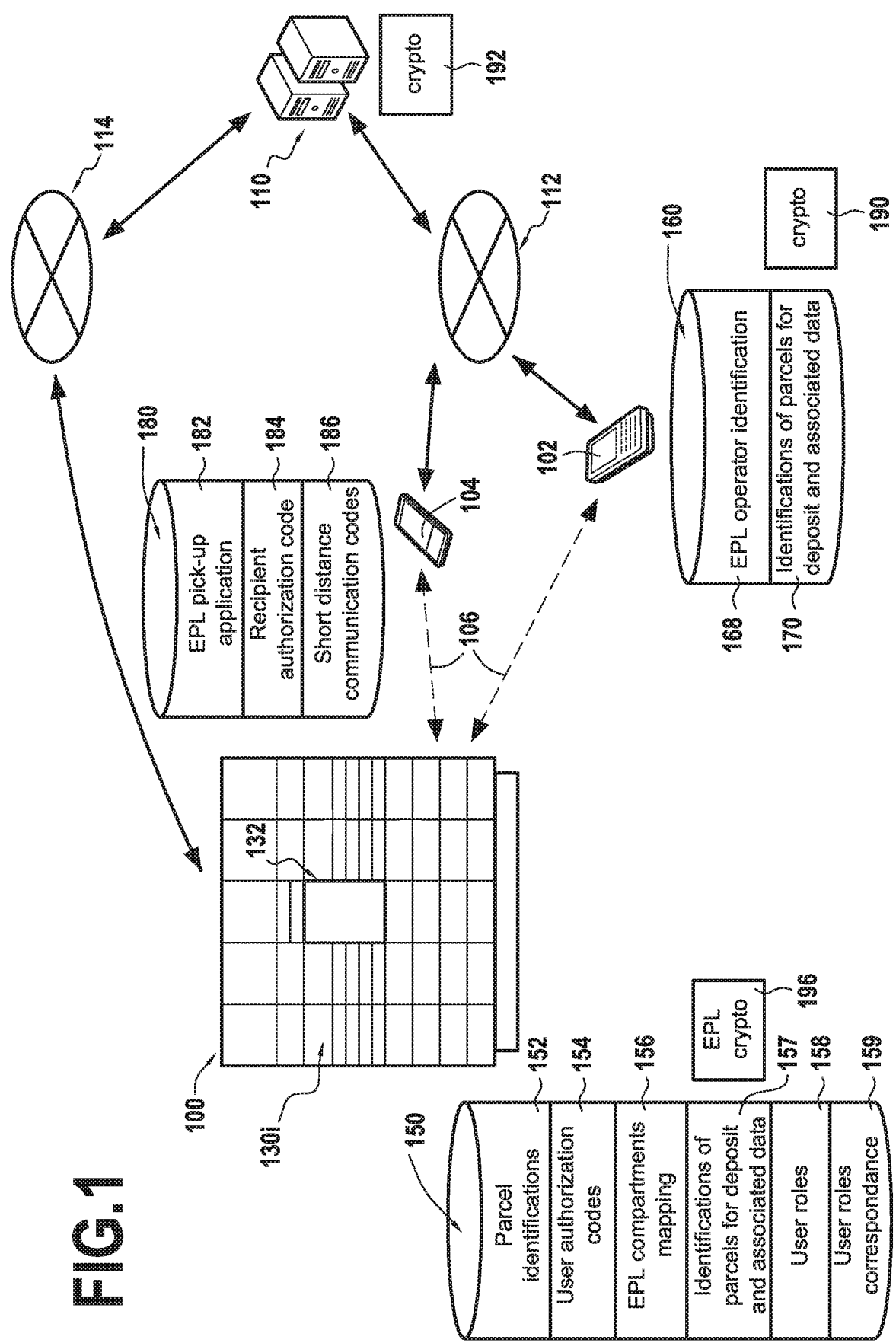
FIG. 1 is a schematic diagram that represents the architecture of the electronic parcel locker system according to a first embodiment of the invention.

In a first embodiment of the invention, the EPL system, as shown on FIG. 1, comprises an EPL 100 communicating with the user mobile device 102 or 104 via a short distance communication network 106, such as local wireless network WIFI or Bluetooth, and a remote shipping system 110, which manages authorization access to the EPL and data regarding the shipments handled by the EPL 100 and which communicates with the user mobile device 102 or 104 via a long distance communication network 112 based on a technology such as 3G-4G GSM. Data exchange between the EPL 100 and the remote shipping system 110 is performed directly via a long distance communication network 114, which can be the same as the long distance communication network 112. The EPL comprises a series of compartments 130i of different sizes and equipped with an electronically controlled door. The EPL operation, and in particular the opening and closing of the compartment doors, is controlled by a control unit 132, which also controls the communication with the user mobile device and an EPL digital storage 150. It is to be understood that the term storage, generically used in the overall description of the different embodiments of the invention, may correspond to different memories as well as different types of memories including ROM, hard drive, flash drive, or the like and databases. Data generated and/or initially stored in the remote shipping system 110, such as identifiers for the parcels to be deposited in the EPL's compartments or the recipients' authorization codes, are transmitted directly to the EPL 100 and stored in the EPL storage 150. In parallel, some data generated and/or initially stored in the remote shipping system 110, such as the recipient's authorization code, are transferred to the recipient's mobile device 104. When short distance communication between the EPL 100 and the recipient's mobile device 104 is established, access authorization for the recipient can be performed by the EPL based on the recipient's authorization code stored in the recipient's mobile device 104 and the recipient's authorization code stored beforehand in the EPL 100. The EPL storage 150 stores data for operating the EPL 100 such as the identifiers of the parcels deposited in the EPL's compartments, which are stored in a Parcel identifiers table 152 of the EPL storage 150 or the recipients' authorization codes, which are stored in the user authorization codes table 154 of the EPL storage 150. Following on operations performed on the EPL, such as parcels deposit or collection by the carrier agent or parcel pick-up by the recipient, data associated to these operations, such as the identifiers of the parcels deposited in or collected from or pick-up from the EPL's compartments, are transmitted directly from the EPL 100 to the remote shipping system 110 via the long distance communication. The associations between compartments of the EPL 100 and the identifiers of each of the parcels stored in the EPL 100, as well as the recipients' authorization codes, are maintained in an EPL compartments mapping 156 of the EPL storage 150. Preferably, the identifiers of the parcel to be deposited are stored in an Identifiers of parcels for deposit and associated data table 157 of the storage 150 so that check regarding the deposits can be performed by the EPL. In a preferred embodiment, all data exchanged between the remote shipping system 110 and the EPL 100, directly or via the user mobile device 102 or 104, are encrypted in order to ensure authentication and eventually also confidentiality. Preferably, in order to secure data authentication, the data emitter (either the remote shipping system 110 or the EPL 100) cryptographically signs the data to be transmitted with a private key and the data receiver cryptographically verifies the data signature with a public key.

User roles are pre-defined for each type of users of the EPLs, including deposit/collection carrier agent, pick-up recipient or maintenance agent. These roles and their associated functionalities are pre-loaded in an EPL user roles table 158 of the EPL storage so that, each time access to the EPL is authorized for the user via his mobile device, the EPL user role is identified and functionalities associated with the EPL user role are made available by the EPL. The association between the user and his role and their associated functionalities is performed by using a users' roles correspondence table 159 of the EPL storage 150. In the case of operators, an EPL operator identifier 168 is used to allow access for the operator to the EPL 100, and is stored in an operator storage 160 of the mobile device 102. Each EPL operator identifier is associated with a corresponding EPL operator role. In a particular embodiment of the invention, each user role has a specific identifier in the EPL storage, which is used for pointing to that particular user role.

Preferably, the operator mobile device 102, typically used by a carrier agent or a maintenance agent, is generically configured so that it can be used by any authorized user. To be authorized for using the operator mobile device 102, an operator enters his user identifier for mobile device. Based on the user identifier for mobile device entered by the operator, the EPL operator identifier is generated by the operator mobile device 102. Alternatively, the EPL operator identifier 168 is retrieved from a table loaded in the operator mobile device 102 and which associates each user identifier for mobile device with an associated EPL operator identifier. Such a design allows for user identifiers for mobile device to be simple and user friendly, while EPL operator identifiers, which are used in a public area for establishing the short distance communication between the operator mobile device 102 and the EPL 100, are complex. Preferably, the list of identifiers for the parcels to be deposited in a particular EPL as well as associated data such as the parcels sizes are transmitted from the remote shipping system 110 to the mobile device 102 and stored in an Identifiers of parcels for deposit and associated data table 170 of the operator storage 160. The parcel size information can be used during the deposit or collection process for the appropriate size compartment to be automatically selected. Data and associations in the operator storage 160 the mobile device 102 are updated by the remote shipping system 110 via the long distance communication network 114.

In order for the parcel recipient to pick-up his parcel from the EPL 100, he is provided with an authorization code for accessing the EPL 100 and retrieving his parcel from the EPL 100. A Recipient authorization code 184 is stored in a recipient storage 180 of the recipient mobile device 104. The short distance communication connection between the recipient mobile device 104 and the EPL 100 is established by using the short distance communication codes 186, which are stored in the recipient storage 180 of the recipient mobile device 104. In addition, a pick-up application 182 for managing the access by the parcel recipient to the EPL is also stored in the recipient storage 180 of the recipient mobile device 104.

In a preferred embodiment, the access authorization to the EPL is based on cryptographic technologies for authentication and/or confidentiality. The cryptographic generation of the EPL operator identifier is performed by a cryptographic module 190 stored in the operator mobile device 102 or by a cryptographic module 192 stored in the remote shipping system 110. During the access authorization procedure, the EPL operator identifier is interpreted by a cryptographic module 196 stored in the EPL. In the case of the recipient, the cryptographic generation of the Recipient authorization code is performed by the cryptographic module 192 stored in the remote shipping system 110, and during the recipient access authorization procedure, the Recipient authorization code is interpreted by a cryptographic module 196. The cryptographic modules 192 and 196 can also be used for authentication of all data exchanged between the remote shipping system 110 and the EPL 100.

Figure 2:
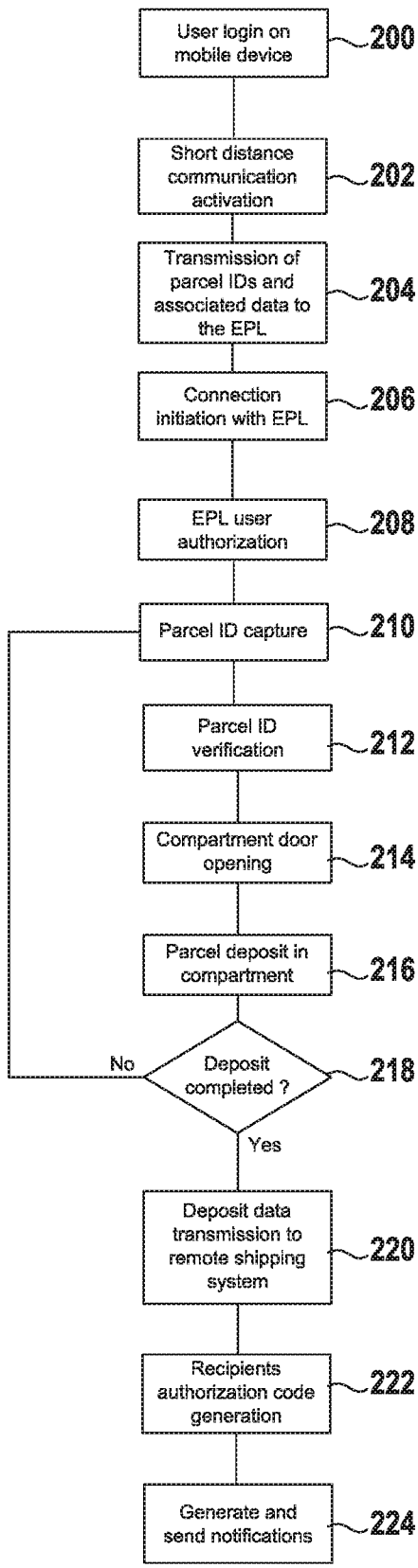
FIG. 2 is a flow diagram that illustrates the process for depositing parcels by a carrier agent into an electronic parcel locker according to a first embodiment of the invention.

FIG. 2 illustrates how the parcel deposit by a carrier agent is performed in this first embodiment of the invention. When a group of parcels is planned to be deposited in a particular EPL 100, the deposit task is assigned to a carrier agent as well as the list of identifiers for parcels for deposit. In order to be authorized to use the operator mobile device 102, the carrier agent performs a login on the operator mobile device 102 (act 200). The login can be performed via any means known in the art such as an identification entry via the mobile device interface (for example by keying the identifier on the keypad or touchscreen of the mobile device), an identification barcode reading by the mobile device or an identifier capture by the mobile device via imaging technology or radio frequency technology. After a successful login, the EPL operator identifier 168 is generated and stored in the operator mobile device 102 and the short distance communication is automatically activated for the operator mobile device 102 (act 202). This newly generated EP operator identifier is transmitted to the remote shipping system 110, which transmits it to the EPL 100 where it is stored in the User authorization codes table 154 so that the EPL can use it for authorizing the operator latter on. Alternatively, the EPL operator identifier is retrieved from the table 168 loaded in the operator mobile device 102, which associates each user identifier for mobile device with an associated EPL operator identifier. Typically, the EPL operator identifiers are generated by the remote shipping system 110. In this alternative, the associated EPL operator identifiers corresponding to the authorized users are also transmitted in parallel by the remote shipping system 110 to the EPL 100. Preferably, the list of identifiers of the parcels to be deposited and associated data are transmitted from the remote shipping system 110 to the EPL 100 and stored in the Identifiers of the parcels for deposit and associated data table 157 in the EPL storage 150 (act 204). When the carrier agent arrives near the EPL 100, the short distance communication connection is automatically initiated between the operator mobile device 102 and the EPL 100 as short distance communication is active both on the operator mobile device 102, and on the EPL 100, for which short distance communication is always active (act 206). Alternatively, the short distance communication may have been deactivated for the operator mobile device 102, automatically or manually, for example in order to minimize electric consumption. Then, when the carrier agent arrives near the EPL 100, he activates the short distance communication on the operator mobile device 102 and the short distance communication connection is automatically initiated between the operator mobile device 102 and the EPL 100. In act 208, the EPL performs the authorization procedure for allowing access to the EPL by checking for a match between the user authorization code stored in the User authorization codes table 154 of the EPL storage 150 in the EPL 100 and the EPL operator identifier 168, which is stored in the storage 160 of the operator mobile device 102 and which is transmitted by the operator mobile device 102 to the EPL 100. As this authorization procedure is performed automatically without any data entry by the user, it can be as complex as security requires without impacting the user friendliness of the EPL as long as the procedure is not too long. Preferably, this authorization is based on cryptographic technologies for authentication and/or confidentiality. In a particular embodiment, the cryptographic generation of the EPL operator identifier 168 includes some authenticating data. During the authorization procedure, the EPL operator identifier is interpreted by the cryptographic module 196 stored in the EPL and authenticated for allowing access to the EPL. The authenticating data can be, for example, the serial number of the operator mobile device 102 and/or the email identification of the operator mobile device 102 and/or the EPL identification.

In act 210, the carrier agent captures the parcel identifier attached to the parcel to be deposited in the EPL with his mobile device 102 for example by reading the parcel identification barcode printed on the parcel or by reading a radio frequency signal emitted by a tag on the parcel based for example on RFID technology or NFC technology. The parcel identifier captured by the mobile device 102 is transmitted from the mobile device 102 to the EPL 100. Preferably, the identifiers of the parcel to be deposited are transmitted from the remote shipping system 110 to the EPL before the carrier agent's arrival near the EPL and are stored in the Identifiers of parcels for deposit and associated data table 157 of the EPL storage 150. Then, following on the successful capture by the mobile device 102 of the parcel identifier, the EPL 100 performs a check for a match between the parcel identifier captured by the mobile device 102 and the list of identifiers of the parcels to be deposited, which is stored in the Identifiers of parcels for deposit and associated data table 157 of the EPL storage 150 (act 212). Following on the successful parcel identifier capture and preferably match, the EPL 100 opens the door of a compartment, which is defined according to a set of rules including at least the following: the compartment is empty and the comportment size matches the parcel size (act 214). Preferably, the parcel size is available in the Identifier of parcels for deposit and associated data table 157. Alternatively, if the parcel size is not available in the table 157, the carrier agent is requested to capture the parcel size via the interface of the operator mobile device 102. Once a compartment door is opened, the carrier agent deposits the parcel in the compartment and closes the door (act 216). The EPL 100 stores in the Parcel identifier table 152 the identifier of the parcel, which has just been deposited in the EPL, and associates the parcel identifier with the corresponding compartment location stored in the EPL compartments mapping 156 in the EPL storage 150. If some parcels remain for deposit, the carrier agent proceeds with act 210 (capture of the parcel identifier) and proceeds with the following acts down to act 218 as long as he still wants to deposit more parcels. Preferably, in act 218, the EPL control unit 132 establishes that there are no more parcels to deposit by comparing the list of identifiers of parcels for deposit in table 157 with the parcel identifiers captured in act 210. Alternatively, the carrier agent enters via the interface of the operator mobile device 102 that parcel depositing is completed. The EPL 100 transmits to the remote shipping system 110 data regarding the parcels deposits via the long distance communication network 114 (act 220). Once the deposit information is received by the remote shipping system 110, the remote shipping system 110 generates a Recipient authorization code for each parcel deposited in EPL 100, i.e. associated to each parcel identifier (act 220), and generates and sends notifications to the recipients of parcels, which have been deposited in the EPL 100, informing them of the deposit and providing them with their Recipient authorization code (act 224). The Recipient authorization code is used afterwards by the recipient for picking-up his parcel in the EPL 100. In parallel, the remote shipping system 110 transmits to the EPL 100 the Recipient authorization code, which is stored in the User authorization codes table 154, so that the EPL can authorize access to the recipient in the future. Preferably, along the whole deposit process, the mobile device screen serves as man machine interface for informing and guiding the operator for operating the EPL, for example in case all compartments are utilized and no more deposit is possible.

Figure 3:
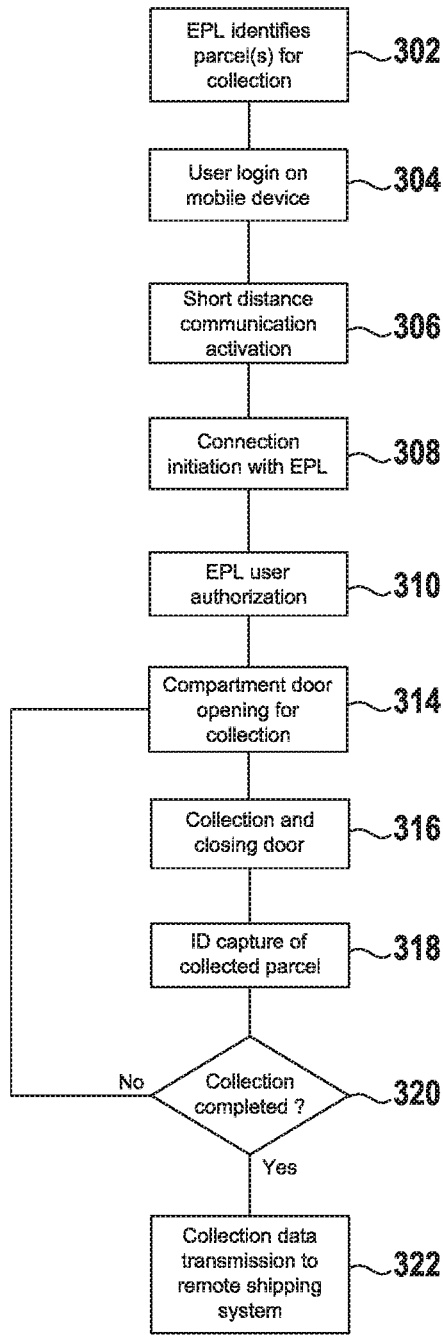
FIG. 3 is a flow diagram that illustrates the process for collecting parcels by a carrier agent from an electronic parcel locker according to a first embodiment of the invention.

FIG. 3 illustrates how the parcel collection by the carrier agent is performed in this first embodiment of the invention. Data required for updating the EPL are transmitted on a regular basis from the remote shipping system 110 to the EPL 100 such as the time limits rules for pick-up by the recipient. Based on the time-limit rule, the EPL 100 establishes when a parcel is due to be collected (act 302). In order to be authorized to use the operator mobile device 102, the carrier agent performs a login on the operator mobile device 102 (act 304). After a successful login, the short distance communication is activated for the operator mobile device 102 (act 306) and the EPL operator identifier 168 is generated and stored in the operator storage 160 of the operator mobile device 102. This newly generated EP operator identifier is transmitted to the remote shipping system 110, which transmits it to the EPL 100 where it is stored in the User authorization codes table 154 so that the EPL can use it for authorizing the operator latter on. Alternatively, the EPL operator identifier 168 is retrieved from the table, which had been previously loaded in the operator mobile device 102, and which associates each user identifier for mobile device with an associated EPL operator identifier. Typically, the EPL operator identifiers are generated by the remote shipping system 110. In this alternative, the associated EPL operator identifiers corresponding to the authorized users are also transmitted in parallel by the remote shipping system 110 to the EPL 100. When the carrier agent arrives near the EPL, the short distance communication connection is automatically initiated between the operator mobile device 102 and the EPL 100 as short distance communication is active both on the EPL 100 and on the operator mobile device 102 (act 308). Alternatively, the short distance communication may have been deactivated for the operator mobile device 102, automatically or manually, for example in order to minimize electric consumption. Then, when the carrier agent arrives near the EPL, he activates the short distance communication on the operator mobile device 102 and the short distance communication connection is automatically initiated between the operator mobile device 102 and the EPL 100. In act 310, the EPL performs the authorization procedure for allowing access to the EPL by checking for a match between the user authorization code stored in the User authorization codes table 154 of the EPL storage 150 in the EPL 100 and the EPL operator identifier 168, which is stored in the operator storage 160 of the operator mobile device 102 and which is transmitted by the operator mobile device 102 to the EPL 100. Preferably, this authorization is based on cryptographic technologies for authentication and/or confidentiality. In a particular embodiment, the cryptographic generation of the EPL operator identifier includes some authenticating data. During the authorization procedure, the EPL operator identifier is interpreted by a cryptographic module 196 stored in the EPL and authenticated for allowing access to the EPL. The authenticating data can be, for example, the serial number of the operator mobile device 102 and/or the email identification of the operator mobile device 102 and/or the EPL identifier. If one parcel or a group of parcels is due to be collected and corresponds to the carrier organization for which the agent works, the EPL 100 opens the door of a compartment storing a parcel to be collected by the carrier agent (act 312) and the carrier agent collects the parcel and closes the door (act 314). The EPL 100 logs information data relative to the parcel collection, and deletes the parcel identifier from the Parcel identifiers table 152 and its association in the EPL compartments mapping 156 as well as the associated Recipient authorization code. Preferably, the EPL 100 retrieves the identifier of the collected parcel via the EPL compartments mapping 156 and transmits it to the operator mobile device 102, and the carrier agent captures the parcel identifier attached to the collected parcel with his mobile device 102 for the operator mobile device 102 to check for a match between the parcel identifier captured by the mobile device 102 and identifier of the collected parcel stored in the EPL 100 (act 316). In act 318, the EPL control unit 132 checks whether the collection process is completed. If some parcels are still due to be collected by the carrier agent, the EPL 100 proceeds with act 312 (compartment door opening for another collection) and proceeds with the following acts down to act 318 as long as there are still parcels for collection. When, in act 318, the EPL control unit 132 establishes that there are no more parcels for collection by the carrier agent or if the carrier agent has indicated via the interface of the operator mobile device 102 that he wanted to stop the collection process, the EPL 100 transmits to the remote shipping system 110 data regarding the parcels collection and preferably any operation information of EPL 100 (act 320). Preferably, along the whole collection process, the mobile device screen serves as man machine interface for informing and guiding the operator for operating the EPL, for example in informing that there is a parcel to be collected or that the collection is completed.

It is easily devised by those ordinary skilled in the art that the deposit process and collection process can be combined when the EPL 100 is operated by a carrier agent. Preferably, the operator mobile device provides the operation interface for informing the carrier agent that parcels must be collected or for the carrier agent to initiate the parcel collection at his convenience.

Figure 4:
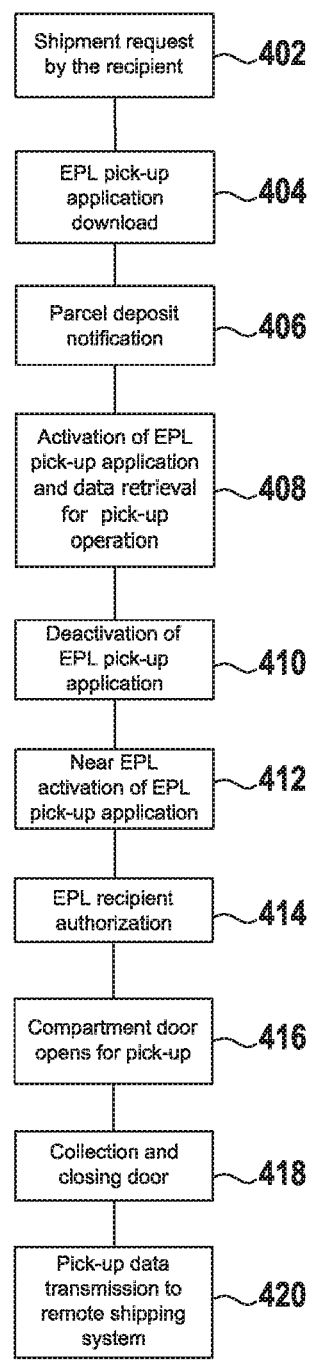
FIG. 4 is a flow diagram that illustrates the process for picking-up a parcel by a recipient from an electronic parcel locker according to a first embodiment of the invention.

FIG. 4 illustrates how the parcel pick-up by a recipient is performed in first embodiment of the invention. When a recipient makes a request for a shipment, typically via a computer system, this request is logged into the remote shipping system 110 (act 402). Preferably, when the recipient chooses that the parcel, which he orders, be delivered in an EPL, the remote shipping system informs the recipient that the EPL pick-up application 182 shall be downloaded onto his recipient mobile device 104. In a preferred embodiment, the recipient is required to agree that the downloaded application can automatically turn on the short distance communication used for the recipient mobile device 104 to communicate with the EPL 100, for example Bluetooth or WIFI, so that the short distance communication is turned on when the EPL pick-up application 182 is activated and the short distance communication between the recipient mobile device 104 and the EPL 100 can be automatically established. This particular embodiment provides a seamless user-friendly experience for the recipient who does not have to activate the short distance communication nor have to remember about it so that connection with the EPL can be fully automatic. The remote shipping system 110 then downloads the EPL pick-up application 182 in the recipient storage 180 of the recipient mobile device 104, or for many standard operating systems for mobile devices, the recipient is requested and guided to use the associated application store, for example apps store™ or Google play™, for downloading the EPL pick-up application onto his mobile device 104 (act 404). After the parcel deposit in the EPL 100, data regarding the parcel deposit is transmitted to the remote shipping system 110 via the carrier agent mobile device 102, and the remote shipping system 110 sends at least one notification to the recipient mobile device 104 for informing the recipient of the parcel deposit in the EPL 100 and of the location of the EPL 100. This notification includes data for operating the EPL 100 for picking-up the parcel comprising at least the Recipient authorization code and preferably the short distance communication codes and the EPL recipient role if these parameters are not downloaded with the EPL pick-up application 182 (act 406). The EPL pick-up application 182 resident in the recipient mobile device 104 is activated by this notification, and retrieves the data for operating the EPL 100 for picking-up the parcel, which are included in the notification, and stores the Recipient authorization code 184 in the recipient storage 180 (act 408). Preferably, the EPL pick-up application 182 is then deactivated either manually by the recipient or automatically, for example in order to minimize electric consumption (act 410). In a preferred embodiment, the notification is a SMS including a message text informing the recipient of the parcel deposit in the EPL 100 and of the location of the EPL 100 and including at least the Recipient authorization code and the codes for establishing the short distance communication by the recipient mobile device 104 with the EPL 100, as part of the data for operating the EPL 100 for picking-up the parcel. For example, in the case of a short distance WIFI communication, the codes for establishing WIFI communication are the SSI code and the associated password. Preferably, the EPL pick-up application 182 cancels the notification SMS so as to delete all data for operating the EPL 100 for picking-up the parcel still visible on the SMS, and generates a notification accessible on the recipient mobile device 104 and limited to informing the recipient of the parcel deposit in the EPL 100 and of the location of the EPL 100, for example in the form a new SMS.

Alternatively to an immediate download of the EPL pick-up application at the time of the request for shipment, the recipient may have the possibility to choose to delay the download of the EPL pick-up application on his mobile device 104. The download of the EPL pick-up application is performed when, after the parcel deposit, the remote shipping system 110 sends the at least one notification to the recipient mobile device 104. In a preferred embodiment, the recipient is required to agree that the downloaded application can automatically turn on the short distance communication used by the EPL 100 so that the short distance communication is turned on when the EPL pick-up application 182 is activated. The EPL pick-up application 182 is then activated manually or automatically and retrieves the data for operating the EPL 100 for picking-up the parcel, which are included in the notification. Preferably, the EPL pick-up application 182 is then de-activated either manually by the recipient or automatically.

When the recipient arrives near the EPL, he activates the EPL pick-up application 182 on his mobile device 104 and the short distance communication is automatically turned on (act 412). The short distance communication connection is automatically initiated between the recipient mobile device 104 and the EPL 100 by using the short distance communication codes 186 stored in the recipient storage 180 of the recipient mobile device 104. Alternatively, the EPL pick-up application 182 may still be active, and the short distance communication is also active, and then the short distance communication connection between the recipient mobile device 104 and the EPL 100 is automatically initiated. In act 414, the EPL performs the authorization procedure for allowing recipient access to the EPL by checking for a match between the Recipient authorization code stored in the User authorization codes table of the EPL storage 150 in the EPL 100 and the Recipient authorization code 184, which is stored in the recipient storage 180 of the recipient mobile device 104 and which is transmitted by the recipient mobile device 104 to the EPL 100. Preferably, this authorization is based on cryptographic technologies for authentication and/or confidentiality. In a particular embodiment, the cryptographic generation of the Recipient authorization code 184 includes some authenticating data. During the authorization procedure, the Recipient authorization code is interpreted by the cryptographic module 196 stored in the EPL and authenticated for allowing access to the EPL. The authenticating data can be, for example, the serial number of the recipient mobile device 104 and/or the phone number of the recipient mobile device 104 and/or the EPL identifier and/or the parcel identifier. The EPL 100 opens the door of a compartment storing the parcel to be picked-up by the recipient (act 416) and the recipient picks-up the parcel and closes the door (act 418). The EPL 100 logs information data relative to the parcel pick-up and deletes the corresponding parcel identifier from the Parcel identifiers table 152 and its association in the EPL compartments mapping 156 as well as the associated Recipient authorization code. The EPL 100 transmits to the remote shipping system 110 data regarding the parcel pick-up via the long distance communication network 114 (act 420). In case the recipient has another parcel to pick-up in parallel, the remote shipping system 110 sends in parallel another notification to the recipient mobile device 104. The EPL pick-up application 182 processes this additional notification, and manages a second parcel pick-up by repeating the pick-up acts from act 414. Preferably, along the whole pick-up process, the mobile device screen serves as man machine interface for informing and guiding the recipient for operating the EPL, the interface operation being controlled by the EPL pick-up application 182, for example in informing that there is another parcel to be picked-up.

Figure 5:
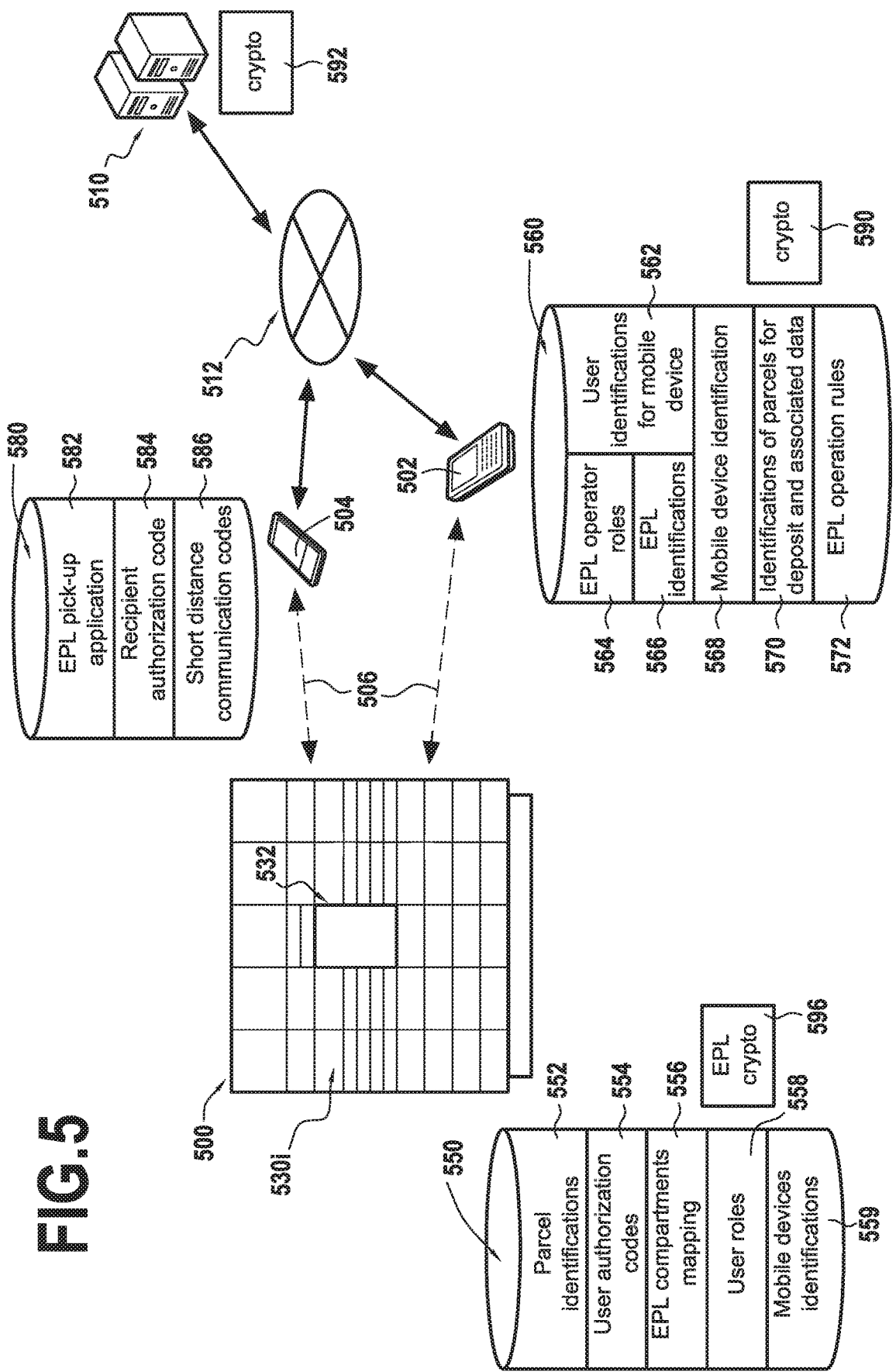
FIG. 5 is a schematic diagram that represents the architecture of the electronic parcel locker system according to a second embodiment of the invention.

In a second embodiment of the invention illustrated on FIG. 5, the EPL system comprises an EPL 500 communicating with a user mobile device 502 or 504 via a short distance communication network 506, such as local wireless network WIFI or Bluetooth, and a remote shipping system 510, which manages authorization access to the EPL 500 and data regarding the shipments handled by the EPL 500 and which communicates with the user mobile device 502 or 504 via a long distance communication network 512 based on a technologies such as 3G-4G GSM. But, there is no direct long distance communication connection between the EPL 500 and the remote shipping system 510, and no data is directly exchanged via any long distance communication network between the EPL 500 and the remote shipping system 510. The EPL 500 comprises a series of compartments 530$i$ of different sizes and equipped with an electronically controlled door. The EPL operation, and in particular the opening and closing of the compartment doors, is controlled by a control unit 532, which also controls the communication with the operator mobile device 502 or 504 and controls an EPL storage 550. Data exchange between the EPL 500 and the remote shipping system 510 is not performed directly via a long distance communication network, but via the operator mobile device, which can be a personal digital assistant (PDA) 502, typically for the carrier agent, or a smartphone 504, typically for the parcel recipient.

Data generated and/or initially stored in the remote shipping system 510, such as identifiers of the parcels to be deposited in the EPL's compartments or the recipients' authorization codes, are transmitted to the carrier agent mobile device 502 as soon as the long distance communication between the operator mobile device 502 and the remote shipping system 510 is established. When short distance communication between the EPL 500 and the carrier agent mobile device 502 is established, data stored in the carrier agent mobile device 502 are transmitted to the EPL storage 550, where, for example, the identifiers of the parcels deposited in the EPL's compartments are stored in a parcel identifier table 552 of the EPL storage 550 and the recipients' authorization codes are stored in a user authorization codes table 554 of the EPL storage 550. The associations between compartments of the EPL 500 and the identifiers of each of the parcels stored in the EPL 500, as well as the recipients' authorization codes, are maintained in an EPL compartments mapping 556 of the EPL storage 550. In parallel, some data generated and/or initially stored in the remote shipping system 510, such as the recipient's authorization code, are transferred to the recipient's mobile device 504. When short distance communication between the EPL 500 and the recipient's mobile device 504 can be established, access authorization for the recipient can be performed by the EPL based on the recipient's authorization code stored in the recipient's mobile device 504 and the recipient's authorization code stored beforehand in the EPL 500. Following on operations performed with the EPL, such as parcels deposit or collection by the carrier agent or parcel pick-up by the recipient, data associated with these operations, such as the identifiers of the parcels deposited in or collected from or pick-up from the EPL's compartments, are transmitted from the EPL 500 to the operator mobile device via the short distance communication. These data are then transmitted from the operator mobile device to the remote shipping system 510 as soon as long distance communication between the operator mobile device and the remote shipping system 510 can be established. In a preferred embodiment, all data exchanged between the remote shipping system 510 and the EPL 500, via the operator mobile device 502 or 504, are encrypted in order to ensure authentication and eventually also confidentiality. Preferably, in order to secure data authentication, the data emitter (either the remote shipping system 510 or the EPL 500) encrypts the data to be transmitted with a private key and the data receiver decrypts the data with a public key.

In the second embodiment of the invention, EPL user roles are pre-defined for each type of users of the EPLs, including deposit/collection carrier agent, pick-up recipient or maintenance agent. For each EPL user role, a specific set of functionalities is made available when the user operates the EPL 500. Specific roles limited to deposit or to collection or to any set of functionalities available can be pre-defined. These roles are pre-loaded in the EPL user roles table 558 of the EPL storage 550 so that, each time access to the EPL is authorized for the user via his mobile device, the EPL user role is identified and the functionalities associated with the EPL user role are made available by the EPL. The functionalities associated with each EPL user role can be stored in the EPL or alternatively in the operator mobile devices 502 in a specific EPL operator roles table 564 of the operator storage 560. The association between the user and his role and their associated functionalities is performed by using a users' roles correspondence table, which also can be stored in the EPL or alternatively in the operator mobile devices 502. In a particular embodiment of the invention, each user role has a specific identifier, which is used for pointing to that particular user role. All operator mobile devices 502, typically used by a carrier agent or a maintenance agent, are generically configured so that they can be used by any type of operator. As part of the configuration of the mobile device 502, the identifiers of all operators of the mobile device 502 are referenced in a User identifiers for mobile device table 562 of the storage 560 the mobile device 502. Each User identifier for mobile device is associated with a corresponding EPL operator role stored in the EPL operator role table 564 of the operator storage 560 as well as with a corresponding list of authorized EPLs that the particular operator can access, which is stored in an EPLs identifiers table 566 of the operator storage 560. In the case of a sharing of the same EPL by several carriers, an operator rule can for example be that the agents of a particular carrier can use only a specified limited number of compartments of the EPL. To be authorized for using the operator mobile device 502, an operator must enter his mobile device user identifier. Based on the user identifier for mobile device entered by the operator, the operator mobile device 502 establishes which EPLs the operator mobile device 502 shall be able to access and which EPL functionalities shall then be made available. Data and associations in the operator storage 560 of the mobile device 502 are regularly updated by the remote shipping system 510 via a long distance communication network 512. Such updates are required in case of changes for the EPL operator roles, and in particular when a new agent has to be added. Updates for the EPL operator roles are then transferred from the mobile device 502 to the EPL 500 via the short distance communication. Preferably, the access right to a particular EPL provided to a particular operator is associated with a specific set of functionalities made available to that particular operator.

Preferably, each mobile device 502 is configured with a unique mobile device identifier 568, which is stored in the operator storage 560. Each mobile device identifier is generated by the remote shipping system 510 and transmitted to each operator mobile device 502, and the list of mobile device identifiers is transmitted to the EPL 500 and stored in a Mobile devices identifiers table 559 of the EPL storage 550. The mobile device identifier is used by the EPL for performing the authorization procedure for allowing operator access to the EPL by checking for a match between a mobile device identifier stored in the Mobile devices identifiers table 559 in the EPL 500 and the mobile device identifier 568, which is stored in the operator mobile device 502. Typically, the fleet of operator mobile devices 502 is pre-configured by the remote shipping system 510. Each time a new EPL is installed in the field, the Mobile devices identifiers table 559 corresponding to the fleet of operator mobile devices is loaded in the EPL. This architecture, where the connection with the EPL is based on the mobile device identifier, allows for easy operator swap. In case the operator of an operator mobile device 502 is changed or in case the operator mobile device 502 is used by different operators, only the user identifiers for mobile device have to be managed in the operator mobile device 502, and the connection with the EPL based on the mobile device identifier does not require any change in the EPL storage. In case a new operator mobile device 502 is added in the fleet of operator mobile devices, a corresponding unique mobile device identifier is created by the remote shipping system 510, is pre-configured in the new operator mobile device 502, and is transferred and added in the Mobile devices identifiers tables 559 of all the EPLs via any operator mobile device 502 of the fleet of operator mobile devices. Alternatively, instead of the unique mobile device identifier, an EPL operator authorization code is stored in the operator storage 560 of the mobile device 502. This EPL operator authorization code can be generated by the remote shipping system 510 or by the operator mobile device 502 based at least on the mobile device operator identifier, and the EPL operator authorization code is transmitted to the EPL 500 and stored in the user authorization codes table 554 of the EPL storage 550.

Preferably, the list of identifiers of the parcels to be deposited in a particular EPL as well as associated data such as the parcels sizes are transmitted from the remote shipping system 510 to the mobile device 502 and stored in an Identifiers of parcels for deposit and associated data table 570 of the operator storage 560, where associated data can include the parcels sizes and the recipient authorization codes associated with each parcel to be deposited. Any update on EPL operation rules such as for example the time limits for pick-up by the recipient associated with the collection rules is performed by transmitting the corresponding data from the remote shipping system 510 to the mobile device 502 and storing them in an operation rules table 572 of the operator storage 560. These updates on EPL operation rules are then transferred from the mobile device 502 to the EPL 500 via the short distance communication.

In order for the parcel recipient to pick-up his parcel from the EPL 500, he is provided with a Recipient authorization code for accessing the EPL 500 and retrieving his parcel from the EPL 500. The Recipient authorization code 584 is stored in the recipient storage 580 of the recipient mobile device 504. The short distance communication connection between the recipient mobile device 504 and the EPL 500 is established by using short distance communication codes 586, which are stored in the recipient storage 580 of the recipient mobile device 504. In addition, a pick-up application 582 for managing the access by the parcel recipient to the EPL is also stored in the recipient storage 580 of the recipient mobile device 504.

In a preferred embodiment, the access authorization to the EPL is based on cryptographic technologies for authentication and/or confidentiality. The cryptographic generation of the EPL operator identifier is performed by a cryptographic module 590 stored in the operator mobile device 502 or by a cryptographic module 592 stored in the remote shipping system 510. During the access authorization procedure, the EPL operator identifier is interpreted by a cryptographic module 596 stored in the EPL. In the case of the recipient, the cryptographic generation of the Recipient authorization code is performed by the cryptographic module 592 stored in the remote shipping system 510, and during the recipient access authorization procedure, the Recipient authorization code is interpreted by a cryptographic module 596. The cryptographic modules 592 and 596 can also be used for authentication of all data exchanged between the remote shipping system 510 and the EPL 500.

Figure 6:
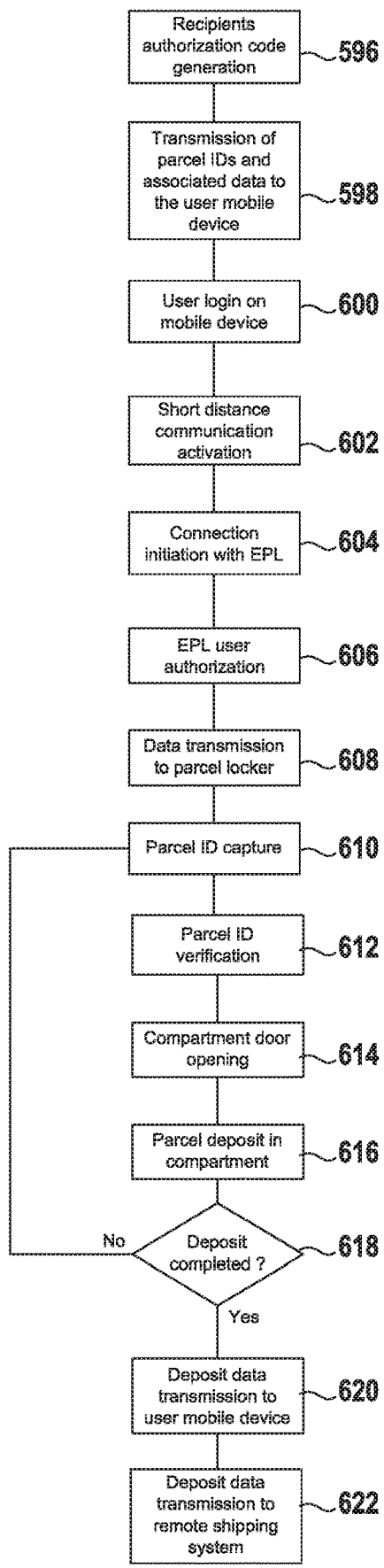
FIG. 6 is a flow diagram that illustrates the process for depositing parcels by a carrier agent into an electronic parcel locker according to a second embodiment of the invention.

FIG. 6 illustrates how the parcel deposit by a carrier agent is performed in this second embodiment of the invention. When a group of parcels is planned to be deposited in a particular EPL 500, the deposit task is assigned to a carrier agent as well as the list of identifiers of parcels for deposit. The remote shipping system 510 generates a Recipient authorization code for each parcel to be deposited, i.e. for each parcel identifier (act 596). The Recipient authorization code is used afterwards by the recipient for picking-up his parcel in the EPL. The list of identifiers of parcels for deposit and the associated list of Recipient authorization codes are transmitted from the remote shipping system 510 to all appropriate operator mobile devices 502 in use by the carrier organization with the identifier of the carrier agent assigned for depositing the group of parcels and are stored in the Identifiers of parcels for deposit and associated data table 570 of the operator storage 560 (act 598). Alternatively, the list of identifiers of parcels for deposit and the associated list of Recipient authorization codes are transmitted from the remote shipping system 510 specifically to only the operator mobile device 502 used by the assigned carrier agent after this carrier agent has logged in on this operator mobile device 502. In order to be authorized to use the operator mobile device 502, the carrier agent performs a login on the operator mobile device 502 (act 600). The login can be performed via any means known in the art such as an identifier entry via the mobile device interface (for example by keying the identifier on the keypad or touchscreen of the mobile device), an identification barcode reading by the mobile device or an identification capture by the mobile device via imaging technology or radio frequency technology. The user login allows the operator mobile device 502 to establish which EPLs the operator mobile device 502 shall be able to access and which EPL functionalities shall then be made available to the carrier agent.

After a successful login, the short distance communication is automatically activated for the operator mobile device 502 (act 602). When the carrier agent arrives near the EPL, the short distance communication connection is automatically initiated between the operator mobile device 502 and the EPL 500 as short distance communication is active both on the EPL 500, for which short distance communication is always active, and on the operator mobile device 502 (act 604). Alternatively, the short distance communication may have been deactivated for the operator mobile device 502, either automatically or manually, for example in order to minimize electric consumption. Then, when the carrier agent arrives near the EPL, he activates the short distance communication on the operator mobile device 502 and the short distance communication connection is automatically initiated between the operator mobile device 502 and the EPL 500.

In act 606, the EPL performs the authorization procedure for allowing access with the operator mobile device 502 to the EPL preferably by checking for a match within the Mobile devices identifiers table 559 of the EPL storage 550 in the EPL 500 for the unique mobile device identifier 568, which is stored in the operator storage 560 of the operator mobile device 502 and which is transmitted by the operator mobile device 502 to the EPL 500. Checking on whether the operator has the access right to this particular EPL is an integral part of the authorization procedure as well as the establishment of the rights of this particular operator based on his user role. Alternatively, the authorization check is based on an EPL user authorization code instead of the unique mobile device identifier, by checking for a match within the User authorization codes table 554 of the EPL storage 550 in the EPL 500 for the EPL user authorization code stored in the operator mobile device 502.

As this authorization procedure is performed automatically without any data entry by the operator, it can be as complex as security requires without impacting the user friendliness of the EPL as long as the procedure is not too long. Preferably, this authorization is based on cryptographic authentication. In a particular embodiment, the cryptographic generation of the mobile device identifier 568 or of the EPL user authorization code includes some authenticating data. During the authorization procedure, the mobile device identifier 568 or the EPL user authorization code is interpreted by a cryptographic module 596 stored in the EPL and authenticated for allowing access to the EPL. The authenticating data for the EPL user authorization code can be, for example, the serial number of the operator mobile device 502 and/or the email identification of the operator mobile device 502 and/or the EPL identifier.

When the authorization is successful, the EPL operator role associated with the operator is transmitted from the operator mobile device 502 to the EPL 500 so that the EPL gives the operator access to the set of functionalities associated with the user role. After a successful authorization, data required for operating the EPL are transmitted from the operator mobile device 502 to the EPL 500 such as the identifiers of the parcels to be deposited in this particular EPL and the associated data including in particular the associated recipient authorisation codes, which are stored in the User authorization codes table 554, or collection rules such as the time limits for pick-up by the recipient (act 608). In act 610, the carrier agent captures the parcel identifier attached to the parcel to be deposited in the EPL with his mobile device 502 for example by reading the parcel identification barcode printed on the parcel or by reading a radio frequency signal emitted by a tag on the parcel based for example on RFID technology or NFC technology. Preferably, following on the successful capture by the mobile device 502 of the parcel identifier, the mobile device 502 checks for a match between the parcel identifier captured by the mobile device 502 and the list of identifiers of the parcels to be deposited, which is stored in the Identifiers of parcels for deposit and associated data table 570 of the operator storage 560 (act 612). Alternatively, the parcel identifier captured by the mobile device 502 is transmitted from the mobile device 502 to the EPL 500 and the EPL 500 performs the check for a match between the parcel identifier captured by the mobile device 502 and the list of identifiers of the parcels to be deposited, which is stored in the EPL 500. In this alternative case, the list of identifiers of the parcels to be deposited may include parcel identifiers, which still remain in the EPL storage 550 following on some previous transmission from other mobile devices.

Following on the successful parcel identifier capture and preferably match, the EPL 500 unlocks the door of a compartment, which is defined according to a set of rules including at least the following: the compartment is empty and the comportment size matches the parcel size (act 614). Other rules for selecting a compartment for deposit may include a rotation rule amongst the compartments for ensuring a homogeneous usage of the compartments in order to prevent the early wear of any particular compartment. The parcel size is available with the identifiers of the parcels for deposit stored in the Identifiers of parcels for deposit and associated data table 570. Alternatively, if the parcel size is not available in the table 570, the operator is requested to capture the parcel size via the interface of the operator mobile device 502. Once a compartment door is opened, the carrier agent deposits the parcel in the compartment and closes the door (act 616). The EPL 500 stores in the parcel identifier table 552 the identifier of the parcel, which has just been deposited in the EPL, and associates the parcel identifier with the corresponding compartment location stored in the EPL compartments mapping 556 in the EPL storage 550. After the door closure, the EPL control unit 532 checks whether the deposit process is completed by comparing the parcel identifiers, which have been captured in act 610, with the list of identifiers of parcels for deposit (act 618). If some parcels remain for deposit, the carrier agent proceeds with act 610 (capture of the parcel identifier) and proceeds with the following acts down to act 618 as long as he still has parcels for deposit. When, in act 618, the EPL control unit 532 establishes that there are no more parcels for deposit or the carrier agent has indicated via the interface of the operator mobile device 502 that he wanted to stop the deposit process, the EPL 500 transmits to the operator mobile device 502 data regarding the parcels deposits such as the identifier of the parcels, which have been deposited, or the identifier of the parcels, which have been not been deposited (act 620). As soon as the communication between the operator mobile device 502 and the remote shipping system 510 is established, the operator mobile device 502 transmits to the remote shipping system 510 data regarding the parcels deposits via the long distance communication network 512 (act 622). Once the deposit information is received by the remote shipping system 510, the remote shipping system 510 generates notifications to be sent to the recipients of parcels, which have been deposited in the EPL 500, informing them of the deposit and providing them with their recipient authorization code. Preferably, along the whole deposit process, the mobile device screen serves as man machine interface for informing and guiding the operator for operating the EPL, for example in case all compartments are utilized and no more deposit is possible.

Figure 7:
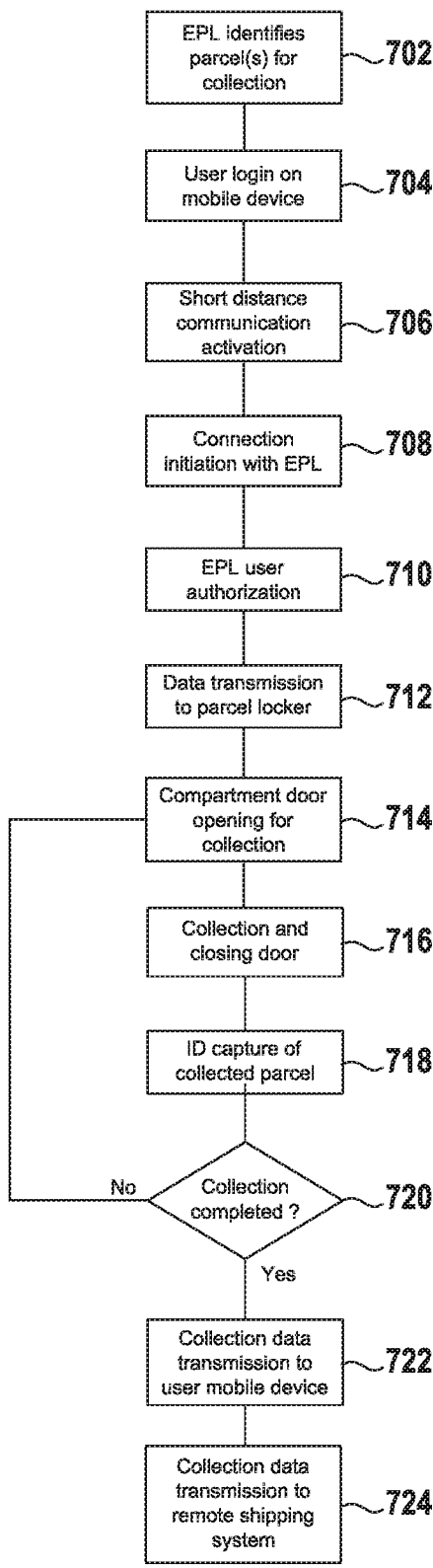
FIG. 7 is a flow diagram that illustrates the process for collecting parcels by a carrier agent from an electronic parcel locker according to a second embodiment of the invention.

FIG. 7 illustrates how the parcel collection by the carrier agent is performed in this second embodiment of the invention. Based on the time-limit rule, the EPL 500 establishes when a parcel is due to be collected (act 702). In order to be authorized to use the operator mobile device 502, the carrier agent performs a login on the operator mobile device 502 (act 704). After a successful login, the short distance communication is activated for the operator mobile device 502 (act 706). When the carrier agent arrives near the EPL, the short distance communication connection is automatically initiated between the operator mobile device 502 and the EPL 500 as short distance communication is active both on the EPL 500 and on the operator mobile device 502 (act 708). Alternatively, the short distance communication may have been deactivated for the operator mobile device 502, automatically or manually, for example in order to minimize electric consumption, then, when the carrier agent arrives near the EPL, he activates the short distance communication on the operator mobile device 502 and the short distance communication connection is automatically initiated between the operator mobile device 502 and the EPL 500.

In act 710, the EPL performs the authorization procedure for allowing access with the operator mobile device 502 to the EPL preferably by checking for a match within the Mobile devices identifiers table 559 of the EPL storage 550 in the EPL 500 for the unique mobile device identifier 568, which is stored in the operator storage 560 of the operator mobile device 502 and which is transmitted by the operator mobile device 502 to the EPL 500. Checking on whether the operator has the access right to this particular EPL is an integral part of the authorization procedure as well as the establishment of the rights of this particular operator based on his user role. Alternatively, the authorization check is based on the EPL user authorization code instead of the unique mobile device identifier, by checking for a match within the User authorization codes table 554 of the EPL storage 550 in the EPL 500 for the EPL user authorization code stored in the operator mobile device 502.

As this authorization procedure is performed automatically without any data entry by the operator, it can be as complex as security requires without impacting the user friendliness of the EPL as long as the procedure is not too long. Preferably, this authorization is based on cryptographic authentication. In a particular embodiment, the cryptographic generation of the mobile device identifier 568 or of the EPL operator identifier includes some authenticating data. During the authorization procedure, the mobile device identifier 568 or the EPL operator identifier is interpreted by the cryptographic module 596 stored in the EPL and authenticated for allowing access to the EPL. The authenticating data for the EPL operator identifier can be, for example, the serial number of the operator mobile device 502 and/or the email identification of the operator mobile device 502 and/or the EPL identifier. When the authorization is successful, the EPL operator role associated with the operator is transmitted from the operator mobile device 502 to the EPL 500 so that the EPL gives the operator access to the set of functionalities associated with the user role. After a successful authorization, data required for operating the EPL are transmitted from the operator mobile device 502 to the EPL 500 such as the time limits rules for pick-up by the recipient (act 712). If one parcel or a group of parcels is due to be collected and corresponds to the carrier organization for which the agent works, the EPL 500 opens the door of a compartment storing a parcel to be collected by the carrier agent (act 714) and the carrier agent collects the parcel and closes the door (act 716). The EPL 500 retrieves the identifier of the collected parcel via the EPL compartments mapping and transmits it to the operator mobile device 502. The EPL 500 logs information data relative to the parcel collection, and deletes the parcel identifier from the Parcel identifiers table 552 and its association in the EPL compartments mapping 556 as well as the associated Recipient authorization code. Preferably, the carrier agent captures the parcel identifier attached to the collected parcel with his mobile device 502 for the operator mobile device 502 to check for a match between the parcel identifier captured by the mobile device 502 and identifier of the collected parcel transmitted by the EPL 500 to the operator mobile device 502 (act 718). In act 720, the EPL control unit 532 checks whether the collection process is completed. If some parcels are still due to be collected by the carrier agent, the EPL 500 proceeds with act 714 (compartment door opening for collection) and proceeds with the following acts down to act 720 as long as there are still has parcels for collection. When, in act 720, the EPL control unit 532 establishes that there is no more parcels for collection by the carrier agent or if the carrier agent has indicated via the interface of the operator mobile device 502 that he wanted to stop the collection process, the EPL 500 transmits to the operator mobile device 502 data regarding the parcels collection and preferably any operation information of EPL 500 (act 722). As soon as the communication between the operator mobile device 502 and the remote shipping system 510 is established, the operator mobile device 502 transmits to the remote shipping system 510 data regarding the parcels collection via the long distance communication network 512 (act 724). Preferably, along the whole collection process, the mobile device screen serves as man machine interface for informing and guiding the operator for operating the EPL, for example in informing that there is a parcel to be collected or that the collection is completed.

It is easily devised by those ordinary skilled in the art that the deposit process and collection process can be combined when the EPL 500 is operated by a carrier agent. Preferably, the operator mobile device provides the operation interface for informing the carrier agent that a parcel needs to be collected or for the carrier agent to initiate the parcel collection at his convenience.

The method for deposit and collection described above ensures that the carrier operation is not disrupted in case of temporary long distance communication issue, for example if the communication between the operator mobile device 502 and the remote shipping system 510 does not operate near the EPL. As the required data to be transmitted to the EPL 500, i.e. the list of carriers and carrier agents authorized to operate the EPL or the EPL user roles or the identifiers of the parcels for deposit and associated data, are transmitted to and stored in the operator mobile device 502 as soon as the long distance communication between the operator mobile device 502 and the remote shipping system 510 is established, they can be transmitted by the operator mobile device 502 to the EPL 500 via the short distance communication when the operator mobile device 502 is near the EPL 500, even if the long distance communication does not operate. After a deposit or collection on the EPL 500 by a carrier agent, the required data to be transmitted to the remote shipping system 510 are transmitted to and stored in the operator mobile device 502 via the short distance communication during the deposit or collection process. These data are then transmitted to the remote shipping system 510 as soon as the long distance communication between the operator mobile device 502 and the remote shipping system 510 is established. So, the eventual delay for transmitting to the remote shipping system 510 these data, such as the EPL status, is manageable and does disrupt the carrier operation as the only delay information is about freed compartments in the EPL 500. It is to be understood that the method embodiments described above also apply to any operation on the EPL 500 by any authorized agent including maintenance agents.

Figure 8:
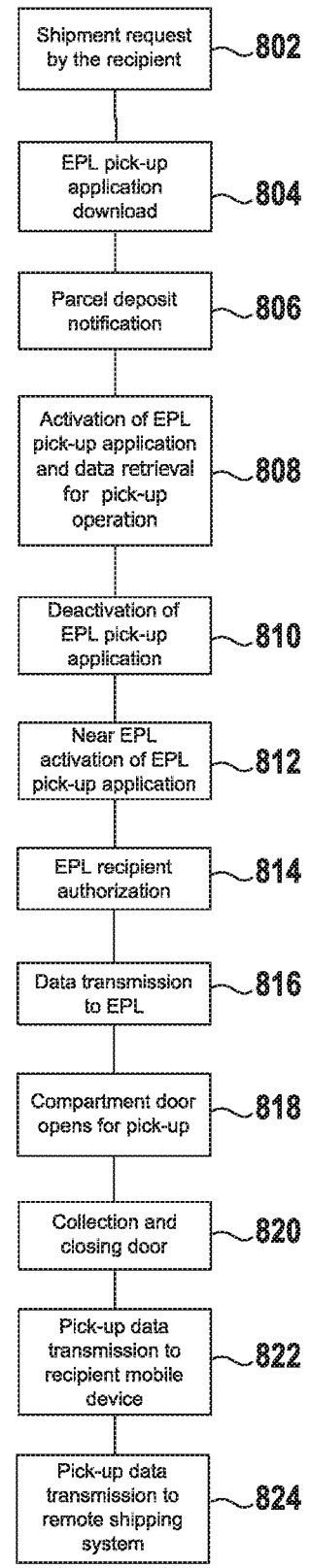
FIG. 8 is a flow diagram that illustrates the process for picking-up a parcel by a recipient from an electronic parcel locker according to a second embodiment of the invention.

FIG. 8 illustrates how the parcel pick-up by the recipient is performed in this second embodiment of the invention. When a recipient makes a request for a shipment, typically via a computer system, this request is logged into the remote shipping system 510 (act 802). Preferably, when the recipient chooses that the parcel, that he orders, be delivered in an EPL, the remote shipping system informs the recipient that the EPL pick-up application 582 shall be downloaded onto his recipient mobile device 504. In a preferred embodiment, the recipient is required to agree that the downloaded application can automatically turn on the short distance communication used for the recipient mobile device 504 to communicate with the EPL 500, for example Bluetooth or WIFI, so that the short distance communication is turned on when the EPL pick-up application 582 is activated and the short distance communication between the recipient mobile device 504 and the EPL 500 can be automatically established. This particular embodiment provides a seamless user-friendly experience for the recipient who does not have to activate the short distance communication nor have to remember about it so that connection with the EPL can be fully automatic. The remote shipping system 510 then downloads the EPL pick-up application 582 in the recipient storage 580 of the recipient mobile device 504, or for many standard operating systems for mobile devices, the recipient is requested and guided to use the associated application store, for example apps store™ or Google play™, for downloading the EPL pick-up application onto his mobile device 504 (act 804). After the parcel deposit in the EPL 500, data regarding the parcel deposit is transmitted to the remote shipping system 510 via the carrier agent mobile device 502, and the remote shipping system 510 sends at least one notification to the recipient mobile device 504 for informing the recipient of the parcel deposit in the EPL 500 and of the location of EPL 500. This notification data for operating the EPL 500 for picking-up the parcel comprising at least the Recipient authorization code and preferably the short distance communication codes and the EPL recipient role if these parameters are not downloaded with the EPL pick-up application 582 (act 806). The EPL pick-up application 582 resident in the recipient mobile device 504 is activated by this notification, and retrieves the data for operating the EPL 500 for picking-up the parcel, which are included in the notification, and stores the Recipient authorization code 584 in the recipient storage 580 (act 808). Preferably, the EPL pick-up application 582 is then de-activated either manually by the recipient or automatically, for example in order to minimize electric consumption (act 810). In a preferred embodiment, the notification is a SMS including a message text informing the recipient of the parcel deposit in the EPL 500 and of the location of the EPL 500 and including at least the Recipient authorization code and the codes for establishing the short distance communication by the recipient mobile device 504 with the EPL 500, as part of the data for operating the EPL 500 for picking-up the parcel. For example, in the case of a short distance WIFI communication, the codes for establishing WIFI communication are the SSI code and the associated password. Preferably, the EPL pick-up application 582 cancels the SMS notification so as to delete all data for operating the EPL 500 for picking-up the parcel, which are still visible on the SMS, and generates a notification accessible on the recipient mobile device 504 and limited to informing the recipient of the parcel deposit in the EPL 500 and of the location of the EPL 500, for example in the form of a new SMS.

Alternatively to an immediate download of the EPL pick-up application at the time of the request for shipment, the recipient may have the possibility to choose to delay the download of the EPL pick-up application on his mobile device 504. The download of the EPL pick-up application is performed when, after the parcel deposit, the remote shipping system 510 sends the at least one notification to the recipient mobile device 504. In a preferred embodiment, the recipient is required to agree that the downloaded application can automatically turn on the short distance communication used by the EPL 500 so that the short distance communication is turned on when the EPL pick-up application 582 is activated. The EPL pick-up application 582 is then activated manually or automatically and retrieves the data for operating the EPL 500 for picking-up the parcel, which are included in the notification. Preferably, the EPL pick-up application 582 is then de-activated either manually by the recipient or automatically.

When the recipient arrives near the EPL, he activates the EPL pick-up application 582 on his mobile device 504, if it not activated yet, and the short distance communication is automatically turned on (act 812). The short distance communication connection between the recipient mobile device 504 and the EPL 500 is automatically initiated by using the short distance communication codes 586 stored in the recipient storage 580 of the recipient mobile device 504. Alternatively, when the recipient arrives near the EPL, the EPL pick-up application 582 may still be active, and the short distance communication is also active, and then the short distance communication connection between the recipient mobile device 504 and the EPL 500 is automatically initiated.

In act 814, the EPL performs the authorization procedure for allowing recipient access to the EPL by checking for a match within the User authorization codes table 554 of the EPL storage 550 in the EPL 500 for the Recipient authorization code 584, which is stored in the recipient storage 580 of the recipient mobile device 504 and which is transmitted by the recipient mobile device 504 to the EPL 500. Preferably, this authorization is based on cryptographic technologies for authentication and/or confidentiality. In a particular embodiment, the cryptographic generation of the Recipient authorization code 584 includes some authenticating data. During the authorization procedure, the Recipient authorization code is interpreted by the cryptographic module 596 stored in the EPL and authenticated for allowing access to the EPL. The authenticating data can be, for example, the serial number of the recipient mobile device 504 and/or the phone number of the recipient mobile device 504 and/or the EPL identifier. When the authorization is successful, the operator mobile device 504 transmits to the EPL 500 data including the EPL recipient role so that the EPL gives the recipient access to the set of functionalities associated with the recipient role (act 816). The EPL 500 opens the door of a compartment storing the parcel to be picked-up by the recipient (act 818) and the recipient picks-up the parcel and closes the door (act 820). The EPL 500 retrieves the identifier of the collected parcel via the EPL compartments mapping 556 and transmits it to the recipient mobile device 504. The EPL 500 logs information data relative to the parcel pick-up and deletes the corresponding parcel identifier from the Parcel identifiers table 552 and its association in the EPL compartments mapping 556 as well as the associated Recipient authorization code. The EPL 500 transmits to the recipient mobile device 504 data regarding the parcel pick-up (act 822). As soon as the communication between the recipient mobile device 504 and the remote shipping system 510 is established, the recipient mobile device 504 transmits to the remote shipping system 510 data regarding the parcel pick-up via the long distance communication network 512 (act 824). In a preferred embodiment, the communication cost for the data transmission from the recipient mobile device 504 to the remote shipping system 510 is redirected by the EPL pick-up application 582 to the organisation in charge of the EPL. In case the recipient has another parcel to pick-up in parallel, the remote shipping system 510 sends in parallel another notification to the recipient mobile device 504. The EPL pick-up application 582 processes this additional notification, and manages a second parcel pick-up by repeating the pick-up acts from act 814. Preferably, along the whole pick-up process, the mobile device screen serves as man machine interface for informing and guiding the recipient for operating the EPL, the interface operation being controlled by the EPL pick-up application 582, for example in informing that there is another parcel to be picked-up.

The method for parcel pick-up described above ensures that the carrier or recipient operations are not disrupted in case of temporary long distance communication issue, for example if the communication between the recipient mobile device 504 and the remote shipping system 510 does not operate near the EPL. After a parcel pick-up from the EPL 500 by the recipient, the required data to be transmitted to the remote shipping system 510 are transmitted to and stored in the recipient mobile device 504 via the short distance communication during the pick-up process. These data are then transmitted to the remote shipping system 510 as soon as the long distance communication between the recipient mobile device 504 and the remote shipping system 510 is established. So the eventual delay for transmitting to the remote shipping system 510 these data, such as the EPL status, is manageable and does disrupt the carrier operation as the only delay information is about freed compartments in the EPL 500.

It is easily devised by those ordinary skilled in the art that the first embodiment of the invention and the second embodiment of the invention described above can be combined, for example when two parks of parcel lockers, one park operated according to the first embodiment of the invention and another park operated according to the second embodiment of the invention, are managed by the same carrier organization, are operated by the same carrier agents and are offered for usage to the same pool of recipient clients. Such combined operation may be used when one park is constituted of EPLs installed in areas well covered by long distance communication, and another park is constituted of EPLs installed in areas with limited or no access to long distance communication.

Figure 9A:
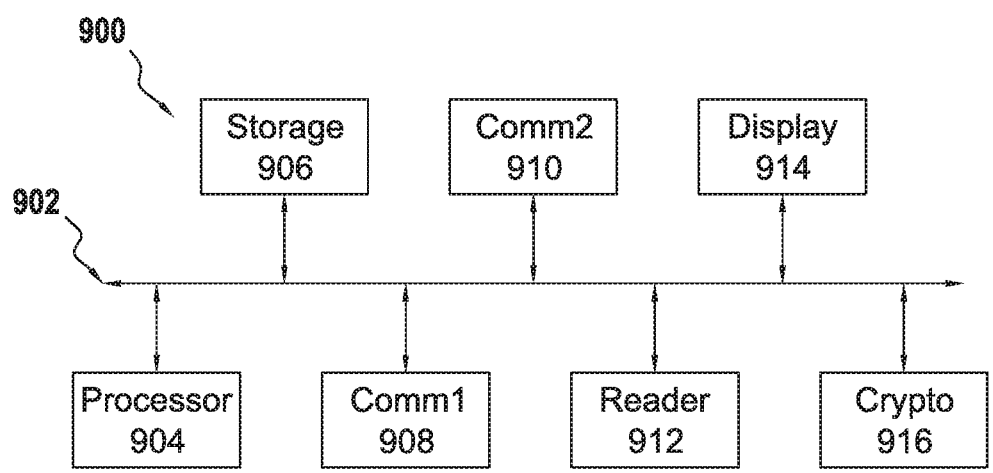
FIG. 9A shows a schematic representation of an example computer system suitable for use with the embodiments of the user mobile devices of the invention.

FIG. 9A shows a schematic representation of an example computer system 900 suitable for implementing embodiments of the user mobile devices 102 or 104 or 502 or 504. The computer 900 includes a bus 902, which connects major components of the computer system 900, such as a processor 904, one or more storage components 906 such as RAM, ROM, flash RAM, hard drive, flash drive, or the like and a communication interface 908 for short distance communication such as WIFI or Bluetooth and another communication interface 910 for long distance communication such as an Ethernet, Internet, wide area network, or similar connection. Additional components are also connected to bus 902, such as a reader 912 such as a barcode reader or a RFID tag reader, and a display 914 such as a touchscreen, or the like, with eventually a keyboard. In a preferred embodiment, the computer 900 also includes a cryptographic module 916 connected to the bus 902.

The bus 902 allows data communication between the processor 904 and the storage 906. The storage comprises, for example, the operator storage 560 or the recipient storage 580 and further generally includes the main memory into which an operating system and application programs are loaded. The storage also can contain, among other code, software which controls basic hardware operation of the system, such as interactions with peripheral components. Applications resident with the computer system 900 are generally stored on and accessed via the storage 906. In the case of the recipient mobile devices, the storage in particular contains the EPL pick-up application.

Figure 9B:
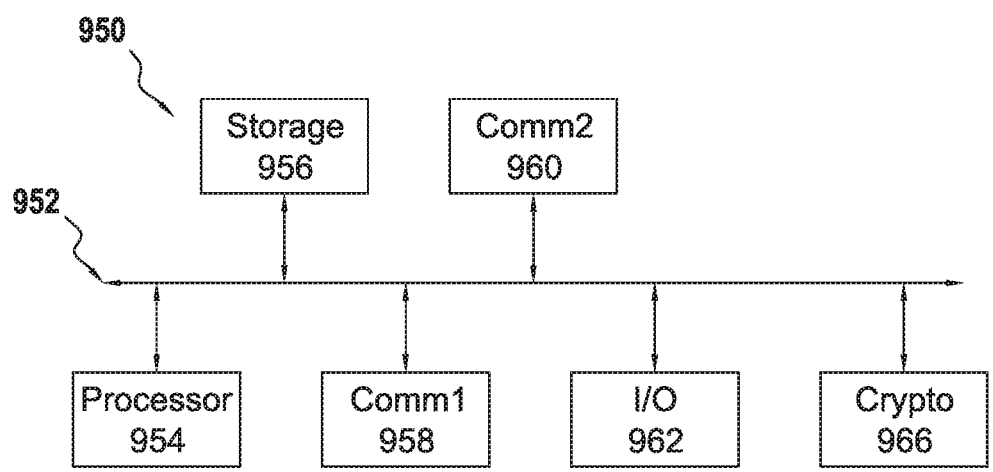
FIG. 9B shows a schematic representation of an example computer system suitable for use with the embodiments of the electronic parcel locker of the invention.
Figure 10:
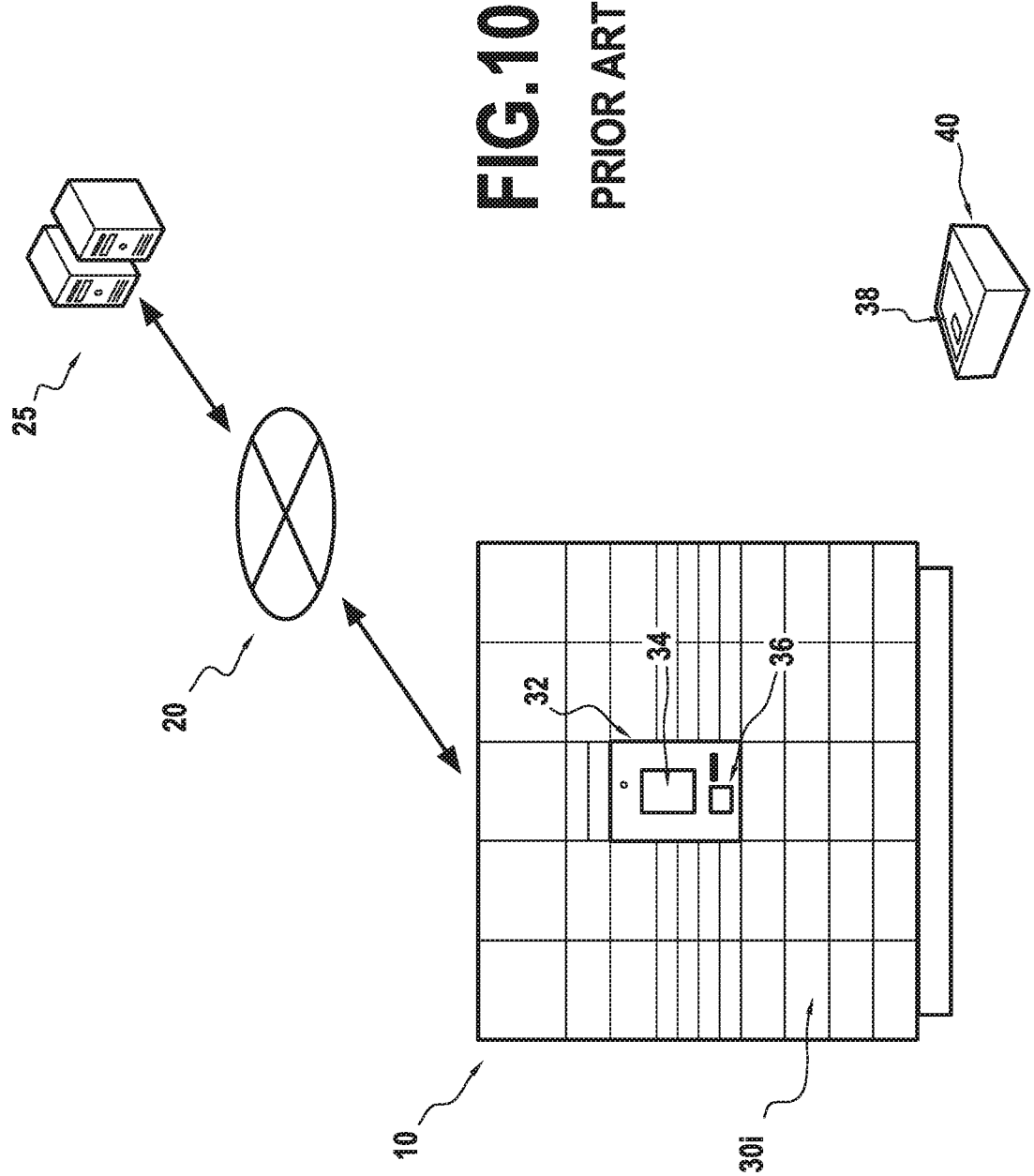
FIG. 10 a schematic diagram that illustrates the prior art electronic parcel locker system.

FIG. 9B shows a schematic representation of an example computer system 950 suitable for implementing embodiments of the EPL 100 or 500. The computer 950 includes a bus 952, which connects major components of the computer system 950, such as a processor 954, one or more storage components 956 such as RAM, ROM, flash RAM, hard drive, flash drive, or the like and a communication interface 958 for short distance communication such as WIFI or Bluetooth and an I/O controller 952 for controlling, for example, the compartments doors of the EPL 100 or 500. For the EPL 100, an additional communication interface 960 for long distance communication such as an Ethernet, Internet, wide area network, or similar connection is connected to bus 952. In a preferred embodiment, the computer 950 also includes a cryptographic module 966 connected to the bus 952.

The bus 952 allows data communication between the processor 954 and the storage 956. The storage comprises the EPL storage 150 or 550 and further generally includes the main memory into which an operating system and application programs are loaded. The storage also can contain, among other code, software which controls basic hardware operation of the system, such as interactions with peripheral components. Applications resident within the computer system 950 are generally stored on and accessed via the storage 956.

For local wireless networks such as WIFI or Bluetooth, the communication interface 908 for short distance communication for the user mobile devices in FIG. 9A and the communication interface 958 for short distance communication for the EPL in FIG. 9B constitutes the components of the short distance communication network 106 or 506.

Additional components may be included in the computer system 900 or 950 as will be understood by one of skill in the art; conversely, all of the components shown in FIG. 9A or 9B need not be present to practice the various embodiments of the invention described herein. The components can be interconnected in different ways from that shown. The operation of a computer such as that shown in FIG. 9A or 9B is readily known in the art and is not discussed in detail in this application.

More generally, although the embodiments of the invention have been described in the case of shipment items such as parcels or packages, it is to be understood that the invention is not limited such items, but can also be applied to any items to be handled with electronic lockers.

The invention claimed is:

1. A method for operating electronic lockers for parcel deposit and collection and pick-up comprises a remote shipping system transmits to at least one mobile device via a long distance communication network data related to parcels to be handled by at least one electronic locker, wherein said at least one electronic locker comprises a pre-defined user roles table and a user roles correspondence table for associating each user to a user role and a pre-defined set of functionalities, said at least one mobile device comprises an operator storage for storing a list of electronic lockers authorized for each operator, and wherein a user operates said at least one electronic locker only with said at least one mobile device via a short distance communication network without using a user interface of said at least one electronic locker and wherein said at least one electronic locker using at least one mobile device via said short distance communication network transmits data related to parcels handling during the user operation of said at least one electronic locker and wherein, for parcel deposit by an operator, only an operator identifier of said operator or only a mobile device identifier of said at least one mobile device is transmitted by said at least one mobile device to said at least one electronic locker for allowing access with said at least one mobile device to said at least one electronic locker, and the method further comprises associating by said at least one electronic locker at least one user with a respective user role and a respective pre-defined set of functionalities using the pre-defined user roles table and the user roles correspondence table.

2. The method according to claim 1, wherein said at least one mobile device automatically initiates communication with said at least one electronic locker via said short distance communication and automatically performs an authorization procedure for allowing said at least one mobile device to operate said at least one electronic locker based on an identifier stored in said at least one mobile device and based on tables stored in said at least one electronic locker.

3. The method according to claim 1, wherein:
user roles are pre-defined for each type of users of said at least one electronic locker,
following an authorization procedure, access to said at least one electronic locker for the user is allowed, and
each user operates said at least one electronic locker based on his user role.

4. The method according to claim 1, wherein no data is exchanged directly via any long distance communication network between said at least one electronic locker and said remote shipping system and wherein data exchanges between said at least one electronic locker and said remote shipping system are performed via said at least one mobile device.

5. The method according to claim 4, wherein said identifier stored in said at least one mobile device and used in said authorization procedure for allowing said at least one mobile device to operate said at least one electronic locker, is an identifier of said at least one mobile device.

6. A method for picking-up a parcel by a recipient in at least one electronic locker wherein a remote shipping system communicates with at least one mobile device via a long distance communication network and wherein the recipient operates said at least one electronic locker with said at least one mobile device via a short distance communication network, comprising act:
downloading onto said at least one mobile device a pick-up application that manages access by the recipient to said at least one electronic locker and which operates said at least one electronic locker, wherein said at least one mobile device comprises an operator storage for storing a list of electronic lockers authorized for each operator,
automatically activating said pick-up application by a notification sent by said remote shipping system to said at least one mobile device, and
receiving onto said at least one mobile device a recipient authorization code generated after the deposit of said parcel by a carrier agent in said at least one electronic locker, wherein said recipient authorization code is the only data required for opening the compartment where the parcel has been deposited and corresponds to a respective pre-defined set of functionalities via a pre-defined user roles table and a user roles correspondence table.

7. The method according to claim 6, wherein said notification includes data to operate said at least one electronic locker for picking-up the parcel, the data comprising at least said recipient authorization code.

8. The method according to claim 6, further comprising automatically deleting, by said pick-up application, said notification received by said at least one mobile device.

9. The method according to claim 6, further comprising automatically turning on, by said pick-up application, the short distance communication used for said at least one mobile device to communicate with said at least one electronic locker.

10. A computerized electronic locker system for parcel deposit and collection and pick-up, comprising:
a remote shipping system,
at least one electronic locker, and
at least one mobile device communicating with said at least one electronic locker via a short distance communication network for transmitting data related to parcels handling during user operation of said at least one electronic locker and with said remote shipping system via a long distance communication network,
wherein a user interface of said at least one mobile device is the only user interface for a user to operate said at least one electronic locker without using a user interface of said at least one electronic locker and wherein, for parcel deposit by an operator, only an operator identifier of said operator or only a mobile device identifier of said at least one mobile device is transmitted by said at least one mobile device to said at least one electronic locker for allowing access with said at least one mobile device to said at least one electronic locker, and wherein said at least one electronic locker comprises a pre-defined user roles table and a user roles correspondence table for associating each user to a user role and a pre-defined set of functionalities, wherein said at least one mobile device comprises an operator storage for storing a list of electronic lockers authorized for each operator.

11. The system according to claim 10, wherein said at least one mobile device comprises an identifier for automatically allowing said at least one mobile device to operate said at least one electronic locker via said short distance communication network based on tables stored in said at least one electronic locker.

12. The system according to claim 10, wherein said at least one electronic locker further comprises a parcel identifier table for storing identifiers of the parcels deposited in compartments of said at least one electronic locker, a user authorization codes table for storing recipient authorization codes and a compartments mapping for maintaining associations between the compartments of said at least one electronic locker and the identifiers of the deposited parcels as well as the recipient authorization.

13. The system according to claim 10, wherein said at least one mobile device comprises a pick-up application for managing the access by a parcel recipient to said at least one electronic locker and in that said at least one electronic locker and said remote shipping system exchange data only via said at least one mobile device.

* * * * *